United States Patent
Morikami et al.

(10) Patent No.: US 8,401,796 B2
(45) Date of Patent: Mar. 19, 2013

(54) METHODS AND SYSTEMS FOR ACOUSTICALLY MONITORING FORMATIONS

(75) Inventors: Yoko Morikami, Sagamihara (JP); Paolo Primiero, Tokyo (JP); Hitoshi Sugiyama, New Malden (GB); Shunetsu Onodera, Glos (GB); Vanessa Dreuillault, Paris (FR); Shin'ichi Houshuyama, Hachioji (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 824 days.

(21) Appl. No.: 12/239,821

(22) Filed: Sep. 29, 2008

(65) Prior Publication Data
US 2010/0082257 A1 Apr. 1, 2010

(51) Int. Cl.
*G01V 1/40* (2006.01)
(52) U.S. Cl. .......................................................... 702/11
(58) Field of Classification Search ................. 702/1–13
See application file for complete search history.

(56) References Cited

U.S. PATENT DOCUMENTS

| | | | | |
|---|---|---|---|---|
| 5,157,392 A | * | 10/1992 | Zimmer | 340/853.9 |
| 5,265,067 A | * | 11/1993 | Chang | 367/31 |
| 5,831,934 A | * | 11/1998 | Gill et al. | 367/25 |
| 6,782,970 B2 | | 8/2004 | Chang | |
| 2007/0062696 A1 | | 3/2007 | Wilson et al. | |

OTHER PUBLICATIONS

P. Primiero, V. Dreuillault, H.Sugiyama, T.Ikegami, K.Fujii, M.Fukuhara, C. Chang, M.Yasuda, "Acoustic Monitoring of Methane Hydrate Production: System Development, Deployement and Modeling/Measurement Evaluation", Proceedings of the 6th Int'l Conference on Gas Hydrates (ICGH 2008).

* cited by examiner

*Primary Examiner* — Stephen Cherry
(74) *Attorney, Agent, or Firm* — Jianguang Du; Jody DeStephonis

(57) ABSTRACT

Methods and systems for acoustically determining reservoir parameters of subterranean formations. A tool comprising a plurality of acoustic sources and configured for acoustic measurements is deployed within a wellhole. Acquired acoustic data are processed and utilized for deriving key parameters for the formations. The plurality of acoustic sources include a plurality of hammer sources, where at least one of the hammer sources includes an actuator that is adapted to strike a surface to generate acoustic energy.

18 Claims, 10 Drawing Sheets

(PRIOR ART)

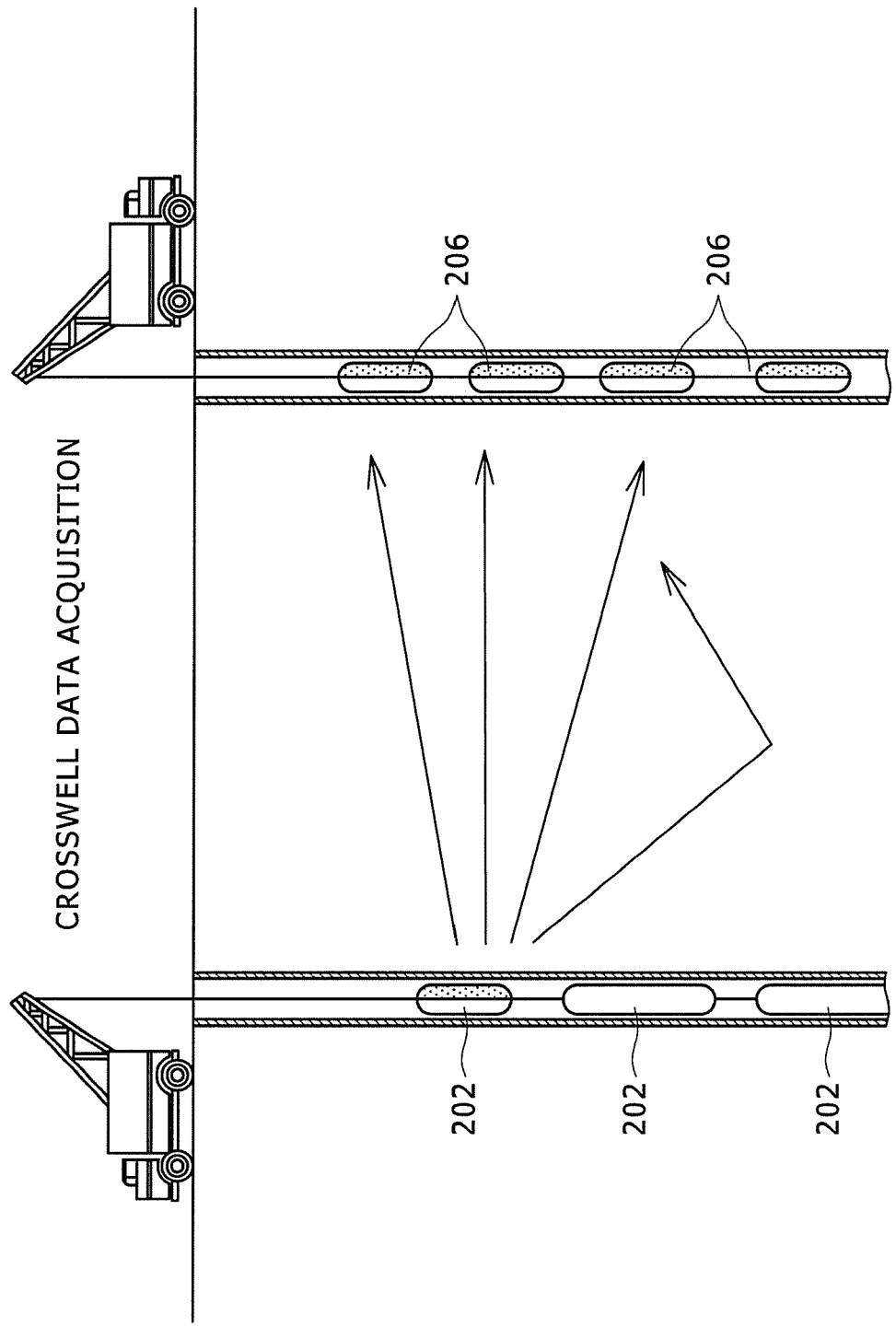

(PRIOR ART)

METHODS AND SYSTEMS FOR ACOUSTICALLY MONITORING FORMATIONS

BACKGROUND

The present disclosure relates generally to methods and systems for performing acoustic measurements of subterranean formations. More specifically, some aspects disclosed herein are directed to methods and systems that utilize multiple acoustic energy sources in a borehole for characterizing subterranean formations having oil and/or gas deposits therein.

Seismic exploration can provide valuable information useful in the drilling and operation of oil and gas wells. In seismic exploration, energy is introduced by a seismic source to create a seismic signal that is propagated throughout the subterranean formation. This seismic signal is reflected to differing degrees by features that are of interest. A receiver monitors these reflected signals to help generate a seismic map of the underground features. This map is generated by knowing the exact time that a seismic signal was activated as compared to the time that the reflected signal is received. As a practical matter, the system comprises a plurality of sources and receivers to provide the most comprehensive map possible of subterranean features. Different configurations may yield two dimensional or three dimensional results depending on their mode of operation.

As disclosed herein, the subject formations may be saturated with oil and gas deposits including gas hydrates, such as methane hydrates. A gas hydrate is a crystalline solid that is a cage-like lattice of a mechanical intermingling of gas molecules in combination with molecules of water. The name for the parent class of compounds is "clathrates" which comes from the Latin word meaning "to enclose with bars." The structure is similar to ice but exists at temperatures well above the freezing point of ice. Gas hydrates include carbon dioxide, hydrogen sulfide, and several low carbon number hydrocarbons, including methane. In one aspect, the disclosure herein relates to the recovery of methane from subterranean methane hydrates.

Methane hydrates are known to exist is large quantities in two types of geologic formations: (1) in permafrost regions where cold temperatures exist in shallow sediments and (2) beneath the ocean floor at water depths greater than 500 meters where high pressures prevail. Large deposits of methane hydrates have been located in the United States in Alaska, the west coast from California to Washington, the east coast in water depths of 800 meters, and in the Gulf of Mexico.

A U.S. Geological Survey study estimates that in-place gas resources within gas hydrates consist of about 200,000 trillion cubic feet which dwarfs the previously estimated 1,400 trillion cubic feet of conventional recoverable gas reserves in the United States. Worldwide, estimates of the natural gas potential of gas hydrates approach 400 million trillion cubic feet.

Natural gas is an important energy source in the United States. It is estimated that by 2025 natural gas consumption in the United States will be nearly 31 trillion cubic feet. Given the importance and demand for natural gas the development of new cost-effective sources can be a significant benefit for American consumers.

Gas hydrates dissociate or form when temperature and/or pressure conditions cross the equilibrium border. In considering gas hydrates as an energy resource, understanding those parameters is important for developing efficient production schemes. Producing natural gas from gas hydrates is a technical challenge by itself; it requires substantial engineering effort and a thorough understanding of the behavior of the hydrates underground. The latter becomes more significant for commercial production, which requires stable and well-controlled production methods.

Gas production from hydrates accompanies significant change of petrophysical, geophysical, and geomechanical properties of the hydrate bearing formations due to hydrate dissociation, which is phase transition from solid to a mixture of liquid and gas. In some cases, the formation could collapse because of a lack of strength after the dissociation. To avoid such a situation, and to appropriately manage gas production, it is important to know the range of the hydrate dissociation, i.e., where the dissociation front is.

Although acoustic logging tools are known, there is need for improved methods and systems for acoustically monitoring subterranean formations to derive key parameters relating to the formations. In this, one object of the present disclosure is to provide an improved downhole seismic tool having multiple sources. A tool with a plurality of acoustic sources may be used, for example, to conduct crosswell tomography for enhanced seismic resolution in the formations surrounding the borehole. Another object of the present disclosure is to enable acoustic imaging of subterranean formations with an acoustic tool configured, for example, to monitor the dissociation front in a gas hydrate bearing formation.

SUMMARY OF THE DISCLOSURE

The disclosure herein may meet at least some of the above-described needs and others. In consequence of the background discussed above, and other factors that are known in the field of formation analysis, applicants recognized need for methods and systems for acoustically monitoring subterranean formations with a tool in a borehole having a plurality of acoustic sources mounted thereon to provide faster and more numerous collection of data points. In this, applicants recognized that an apparatus was needed that could generate seismic signals using a plurality of efficient and repeatable acoustic sources having suitable source bandwidth, for example, low frequency acoustic energy for deep imaging, with or without the apparatus being in contact with the borehole wall. Additionally, applicants recognized that the ability to integrate this tool into an integrated data collection device, for example, a multi-shuttle seismic array such as Schlumberger's Versatile Seismic Imager (VSI) tool, would allow for a single testing run rather than multiple runs to collect the same data. Applicants also recognized that a tool capable of addressing the needs described herein would also be suitable for taking the same or similar measurements in boreholes traversing gas hydrates bearing subterranean formations to provide key parameters relating to the gas hydrate deposits, such as time progression monitoring of the dissociation front during production.

Methods and systems disclosed herein are directed at the characterization of formations using measurement technologies proposed herein to monitor key reservoir parameters, such as permeability, location of the dissociation front, in relation to the production of oil and/or gas. For example, methods and systems that utilize principles of acoustic tomography have capability to characterize the behavior of gas hydrates in the formations, among other applications that are disclosed herein. In this, the applicants have found that an integrated monitoring program utilizing acoustic crosswell monitoring systems will provide useful information with respect to the production of gas hydrates from subterranean reservoirs.

In one aspect of the present disclosure, a system for taking acoustic measurements relating to a subterranean formation comprises an acoustic tool comprising a plurality of acoustic sources mounted thereon; a conveyance configured for movement of the acoustic tool in a borehole traversing the subterranean formation; at least one receiver configured to detect signals generated by the acoustic sources; a computer in communication with the plurality of acoustic sources and the at least one receiver; and a set of instructions executable by the computer that, when executed, process the acoustic measurements; and derive parameters relating to the formation based on the acoustic measurements. The at least one receiver may be configured for detecting seismic signals. The plurality of acoustic sources may comprise a plurality of hammer sources.

In some aspects of the present disclosure, each hammer source may comprise a solenoid and a position sensor configured for sensing the position of a solenoid plunger; and the system may comprise a processor configured for monitoring a current profile of the solenoid based on the position of the solenoid plunger. In other aspects, the system may comprise a controller section operably connected to the at least one receiver and configured to adjust data acquisition parameters; a communications interface operably connected to the controller; a surface processing unit, wherein the at least one receiver is configured to transmit electrical signals through the controller section and the communications interface to the surface processing unit, and the surface processing unit is configured to perform signal processing using the electrical signals from the at least one receiver. The at least one receiver may be located at ground level and/or may be located below ground level. In some embodiments, the at least one receiver is located in a production well. In yet other embodiments, the at least one receiver is located in an adjacent borehole traversing the subterranean formation; and the system is configured for crosswell data acquisition.

In some aspects of the present disclosure, the plurality of acoustic sources and the at least one receiver may be configured for crosswell data acquisition. In yet other aspects, the system may be configured for monitoring parameters of gas hydrates during gas production, such as dissociation front, permeability, among other key parameters relating to the production of gas hydrates.

The system may include a coupling assembly configured for abutting the plurality of acoustic sources with the borehole wall and a controller configured to synchronize firing of the plurality of acoustic sources and seismic signal detection of the at least one receiver. In some aspects of the present disclosure, the system may comprise a controller configured to control firing of the plurality of acoustic sources based on the location in the borehole of the acoustic tool. The controller may be configured to control the sources such that signals are generated at intervals of depth of the acoustic tool. The system may comprise a plurality of shuttles wherein each shuttle includes a corresponding one of the plurality of acoustic sources.

Aspects of the present disclosure include an acoustic tool configured for deployment in a borehole traversing a subterranean formation comprising a plurality of shuttles configured for movement in a borehole; each shuttle comprising at least one seismic source configured to generate seismic signals in the subterranean formation.

Yet other aspects of the present disclosure include a method for taking acoustic measurements relating to a subterranean formation comprising deploying a conveyance and an acoustic tool in a borehole traversing the subterranean formation, the acoustic tool comprising a plurality of acoustic sources; detecting seismic signals, generated by the plurality of acoustic sources, at least one depth in the borehole; processing the acoustic measurements; and deriving parameters relating to the formation based on the acoustic measurements. In some aspects, the method may comprise determining a firing time of the plurality of acoustic sources by monitoring a current profile of a solenoid associated with each acoustic source. In other aspects herein, the derived parameters may relate to gas hydrates bearing formations and the gas hydrates may comprise methane hydrate. The derived parameters may comprise dissociation front of the gas hydrates. In other aspects of the present disclosure, the derived parameters may relate to oil bearing formations.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

FIG. 3 illustrates schematically another exemplary operational context of the present disclosure with one exemplary system for acoustically monitoring subterranean formations according to the principles described herein.

Figure 9:
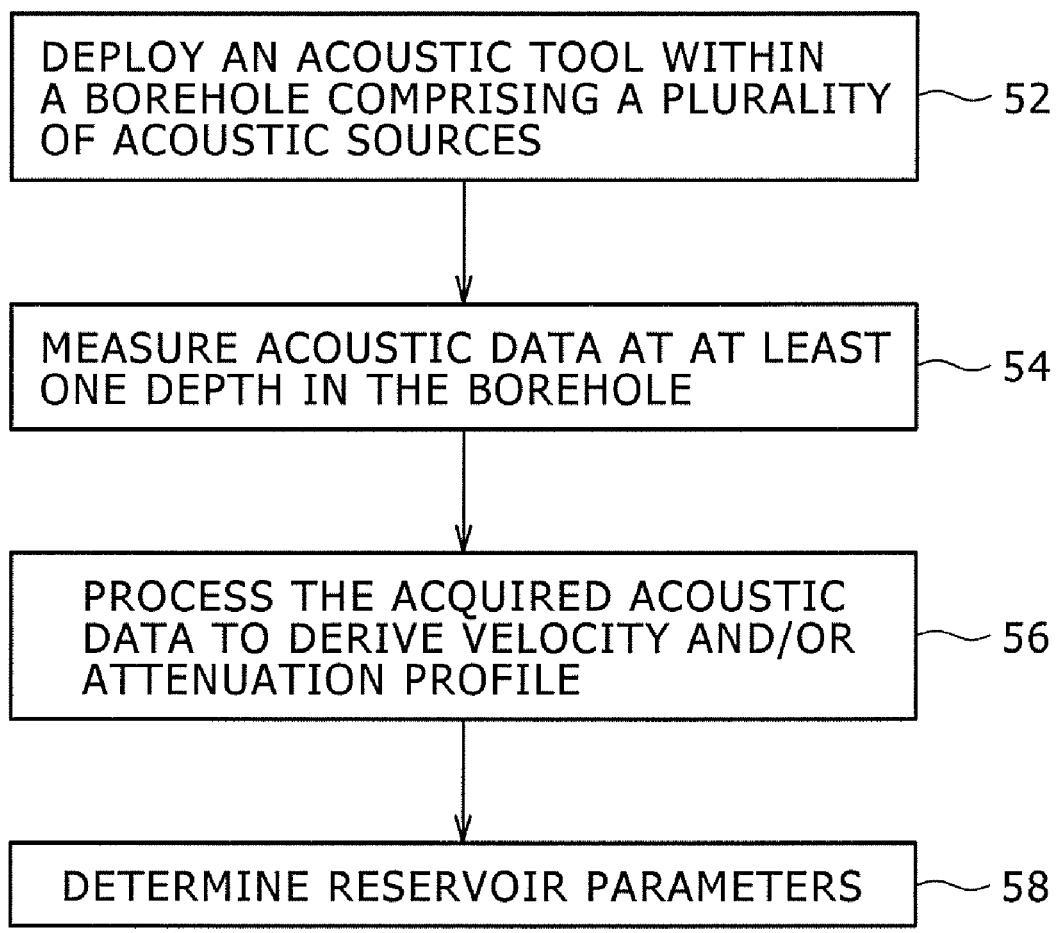

FIG. 9 outlines steps in one method according to the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Figure 1:
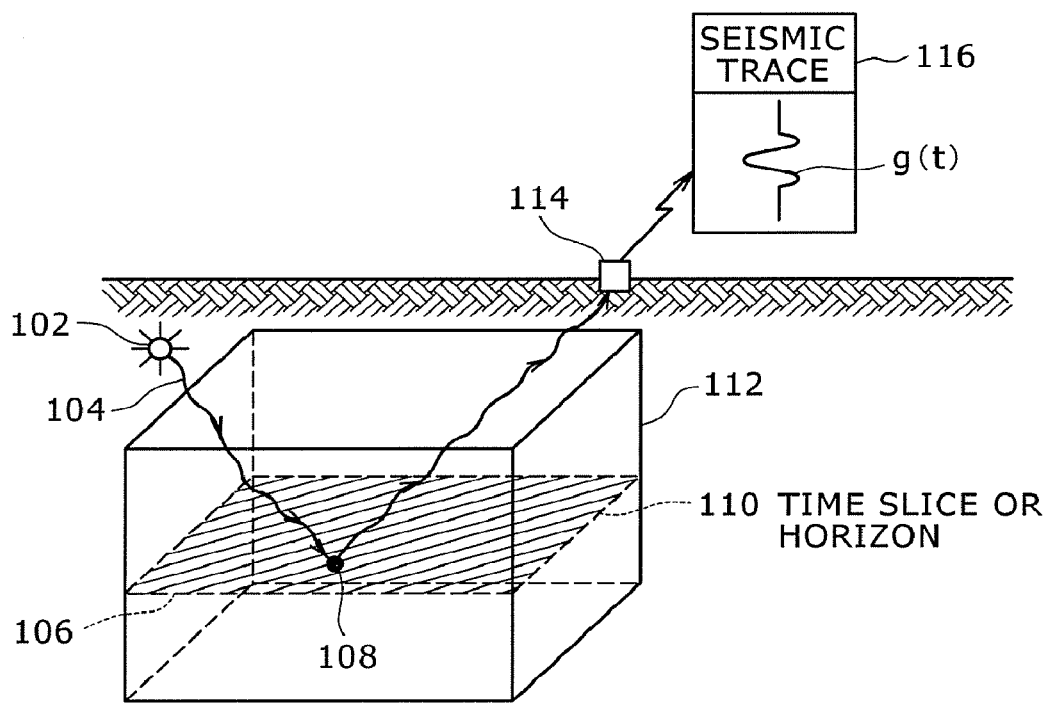
FIG. 1 is a schematic view of one method used in performing a seismic survey.

Referring to FIG. 1, as mentioned above it is desirable to use seismic information to develop maps or images of underground features using a seismic source 102 generating a seismic signal 104. A downhole seismic source is used to determine the geological characteristics of the underground strata in the region surrounding the well in which the source is placed. Receivers such as accelerometers, geophones, or hydrophones detect these seismic waves after they have traveled through the underground strata. After processing, the measured waves can be used to determine the characteristics of the reflecting surfaces in the strata through which they have traveled.

In a first measurement technique, the receivers are placed on the surface. This technique is known as a reverse vertical seismic profile (RVSP). Note FIG. 2A. In a second measurement technique, the receivers are placed in wells which are different from the well in which the source is located. This technique is known as crosswell or interwell seismic. Note FIG. 3. Finally, the receivers may also be placed in the same borehole as the source.

The seismic source is usually suspended from a cable which also conveys from the surface the power to operate the source and to the surface various signals from sensors such as accelerometers associated with the source. Source 102 can be any of a plurality of source types including, but not limited to, an electrical hammer source (such as disclosed, for example in commonly owned U.S. Pat. No. 6,782,970, the entire contents of which are hereby incorporated herein by reference), a small airgun that is impulsive and relatively widebanded, and piezoelectric elements that are swept in frequency in a manner similar to surface vibrators, among others that are known to persons of skill in the art for the purposes described herein, Typically, the downhole sources are used with hydrophone receiver arrays.

The signal 104 propagates throughout the formation 112 to point 108 which is part of plane 106 that comprises a feature of interest. While part of signal 104 generally continues to propagate through the point 108, some of the energy will be reflected back towards the surface and a receiver 114. This receiver in one embodiment may be a geophone with a high sensitivity to seismic signals. As used herein, the terms "receiver" and "sensor" include any suitable device that is configured for detection of source signals and associated noise for the purposes described herein. The terms "hydrophones" and "geophones/accelerometers" include optical or MEMS devices suitable for detection of source signals and associated noise according to the principles described herein.

A clock measures the time of generation of the seismic signal 104 and the time of receipt of the reflected signal at receiver 114. Using this time, it is possible to calculate the depth of the feature of interest. The velocity of the signals through the formation may vary depending on the location, and without an accurate velocity profile, it is difficult to create a reliable image of underground features surrounding the borehole.

Figure 2A:
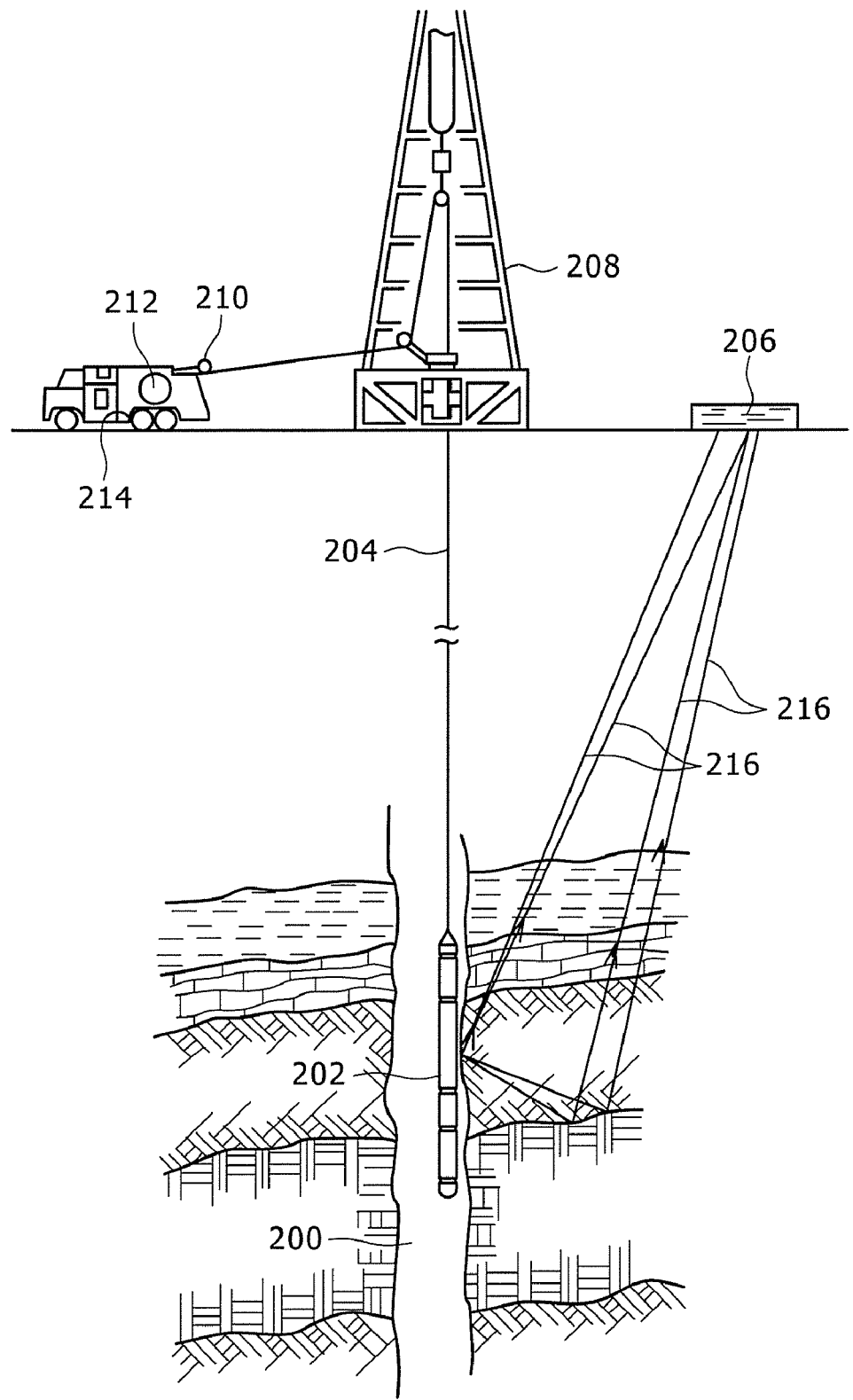
FIGS. 2A and 2B illustrate schematically exemplary operational contexts of the present disclosure with exemplary systems for acoustically monitoring subterranean formations according to the principles described herein.

FIG. 2A shows one possible configuration that may be used in the collection of acoustic measurements throughout the borehole according to the principles described herein. One aspect of the device described herein is a shuttle (note FIG. 2B), so that two or more shuttles may be used simultaneously in the same toolstring (note FIG. 3). The present disclosure contemplates application of the principles herein to various areas, such as wireline, permanent monitoring, hydro-fracture monitoring, production logging, among others. In this, the systems disclosed herein may be deployed on land or on the seabed.

In FIG. 2A, borehole 200 may be a previously drilled well, such as a production well or a monitoring well, with a source shuttle 202 that is used to generate a seismic signal 216. Although one shuttle is depicted in FIG. 2A, a series of shuttles may be provided (note FIG. 3) as desirable or necessary. The source 202 may be any type of suitable instrumentation for generating the desired signals. The generated signals 216 propagate through the formation 205 (note FIG. 2B), and some signals reach a sensor 206 having one or more receiving device for detecting the seismic signals. The sensor arrangement 206 and the associated receiving devices may be used as the primary apparatus for collecting the acoustic measurements, as described in greater detail below. One or more clocks are used to measure the exact time that the signals 216 are generated and when the signals are detected at the one or more receiving device. Because the depth of the section 202 is known and the distance of sensor arrangement 206 is also known, it is possible to calculate a velocity profile for the portion of the formation that is traversed by signals 216.

In one embodiment, a suitable cable 204, for example, a wireline, slickline, or other conveyance that is configured for data telemetry, is provided for communication uphole with a controller module 214 on the surface of the borehole. The analysis module 214 may be a stand alone, or may be integrated into a field vehicle as shown in one example of FIG. 2A.

According to the principles described herein, the shuttle section(s) is moved through the borehole 200 by winch 210, via a suitable arrangement in the drilling tower 208, while seismic signals are detected by the sensor arrangement 206. A device 212 may be used to record the depth of the section 202. In one embodiment, the section 202 may be lowered to a predetermined depth in the borehole 200 and then the winch 210 pulls the conveyance 204, and thus the section 202, up through the borehole 200. In this, data may be acquired by the sensor 206 while the source shuttle(s) 202 is moving up or down in the borehole.

Figure 2B:
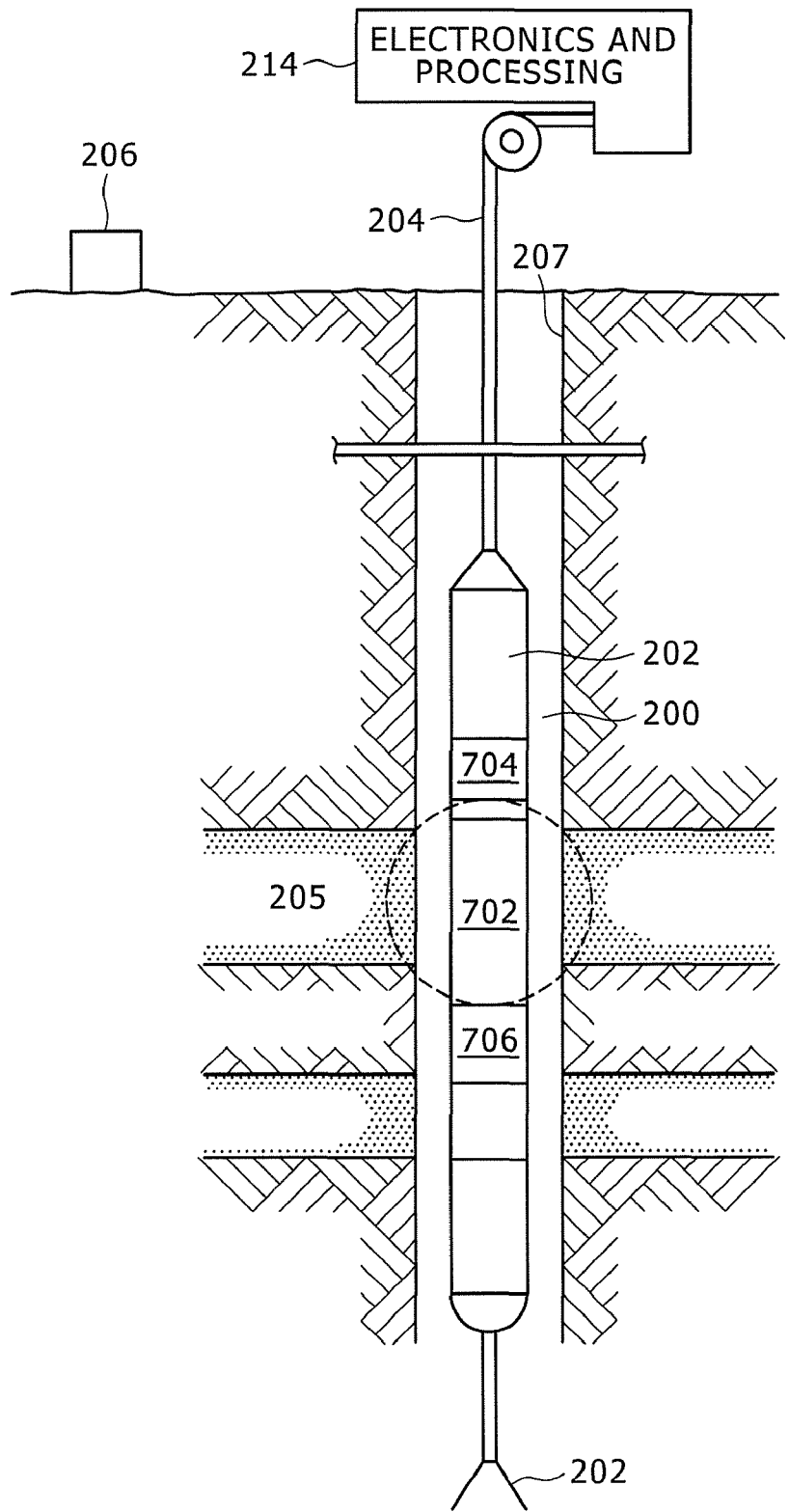

FIG. 2B depicts a toolstring having shuttles 202 deployed in a borehole 200 with a borehole wall 207. FIG. 2B is a schematic representation of one embodiment of an exemplary system for acoustic measurements with an integrated tool according to the principles described herein. The described functions and methods allow for the production of a log of transit times for the seismic energy traveling through the formation 205. In consequence, a much higher resolution velocity model can be obtained. One aspect of the device described herein is a combinable cartridge (note FIG. 2B), so that two or more 702, 704, 706 may be used simultaneously in the same tool string.

The present disclosure contemplates that a plurality of acoustic sources may be provided in the same shuttle 202, or may be mounted on individual shuttles, as desirable or necessary. Moreover, seismic measurements may be combined with other formation analysis techniques, such as electrical resistivity imaging, sonic imaging, pressure, temperature, among others that are known in the art, to provide integrated measurements and formation analysis as desirable or necessary. Such an integrated measurement system may include downhole power sources and/or noise cancellation techniques to facilitate the acquisition of data relating to key formation parameters. For example, techniques disclosed in commonly owned United States Patent Publication No. US20070062696 A1 may be used for powering the multiple downhole acoustic sources and related electronics. Furthermore, the present disclosure contemplates that appropriate techniques may be applied to improve or enhance the acquired acoustic measurements through noise cancellation/SNR algorithms and/or system hardware configurations.

FIG. 3 is a schematic representation of one possible configuration for crosswell data acquisition. Crosswell surveys typically employ a frequency band between 20 Hz and 2000 Hz, depending on the type of source used, the distance between wells and the attenuation characteristics of the zone under investigation Resolution on the order of 10 feet (3 meters) is possible. Crosswell processing is similar to surface seismic processing in that it includes velocity estimation ("travel time tomography") and reflection imaging. Reflection imaging usually provides more resolution than the velocity image ("tomogram") and depends critically on the accuracy of the velocity model for good results.

Figure 4A:
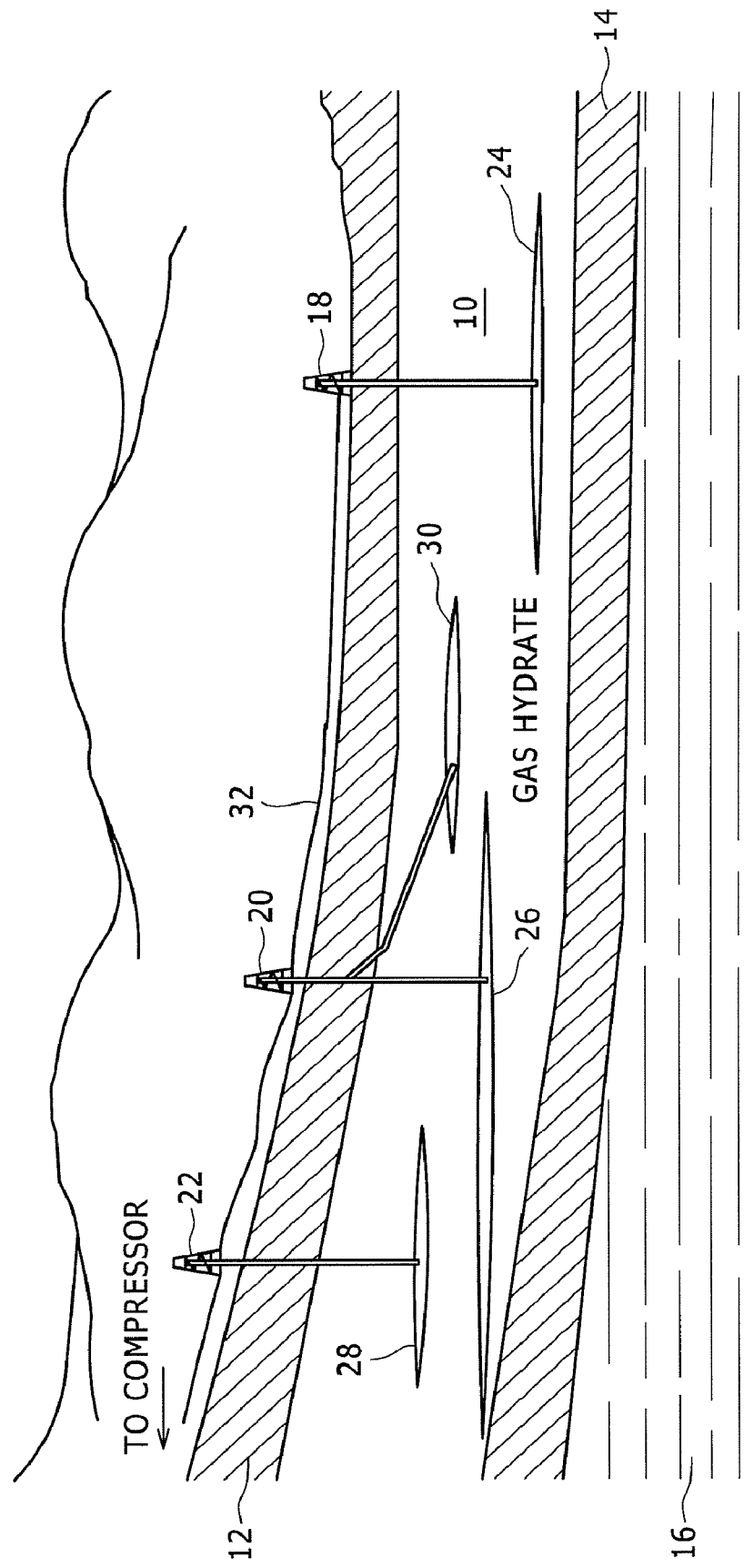
FIG. 4A is a pictorial view of another operational context of the present disclosure such as a geological region of permafrost in Alaska where gas hydrates are know to exist.

FIG. 4A discloses a pictorial representation of one operating context of the present disclosure. In this view a band of gas hydrate 10 lies in a rather shallow geologic zone beneath a permafrost layer 12 such as exists in Alaska. Other earth formations 14 and/or aquifer regions 16 can exist beneath the gas hydrate.

In order to recover sequestered methane gas from within the gas hydrate zone one or more wells 18, 20 and/or 22 are drilled through the permafrost 12 and into the gas hydrate zone 10. Usually a casing is cemented within the well and one or more windows are opened directly into the hydrate zone to depressurize irregular regions of the gas hydrate represented by irregular production zones 24, 26, 28 and 30 extending away from distal terminals of the wells. Although a single well is shown drilled from a single derrick illustrated at 18 and 22 it is envisioned that directional drilling as illustrated at derrick 20 and zone 30 will be a more common practice to extend the scope of a drilling operation.

Once one or more wells are drilled, pressure is relieved from the gas hydrate zone around the well and the methane gas and water molecules will separate and enter the wells. The gas can then be separated from the water and allowed to rise to the surface or is pumped to the surface along with water and separated and fed along a pipeline 32 to a compressor station not shown.

Figure 4B:
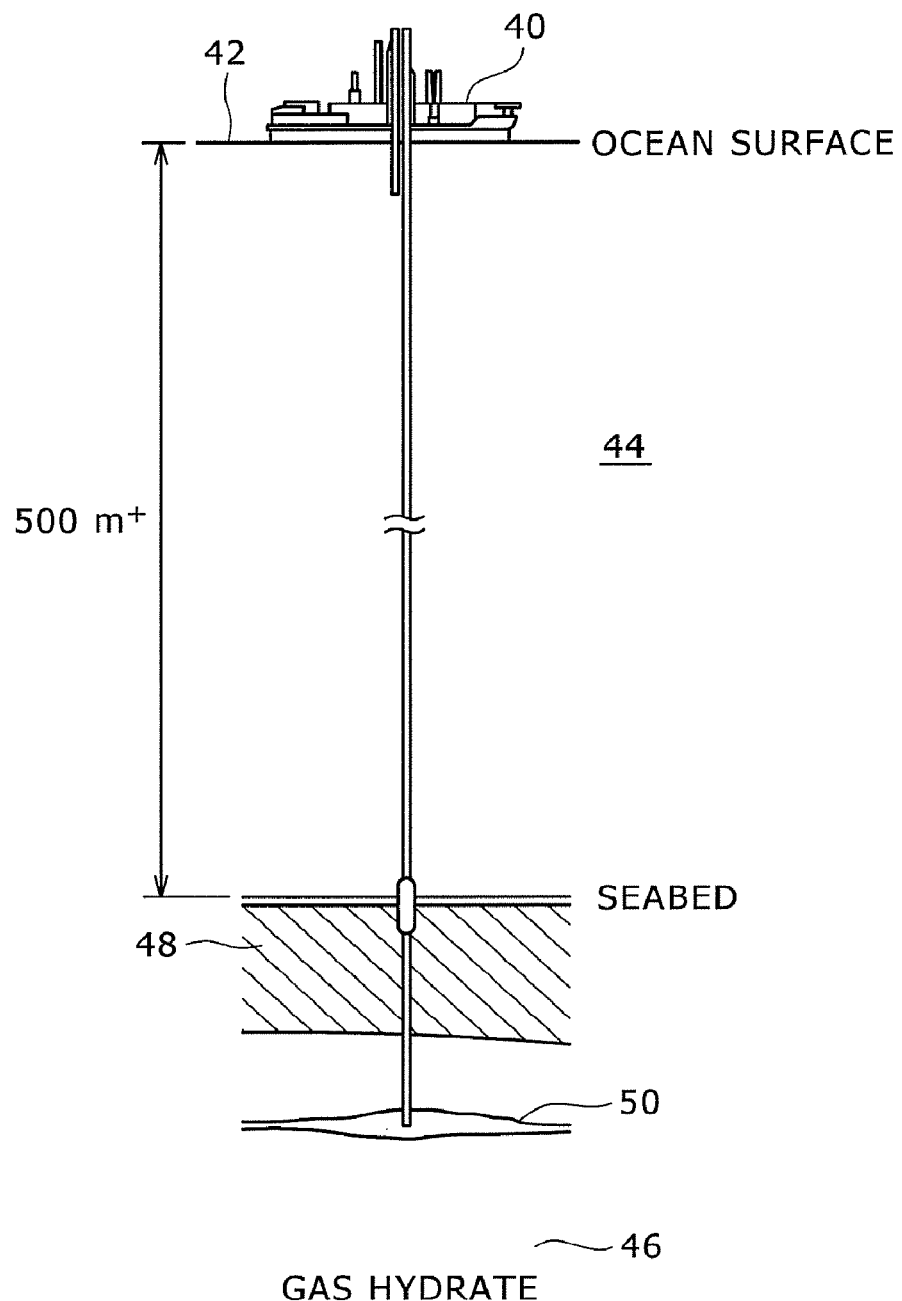
FIG. 4B is a pictorial view of yet another context or geological region of gas hydrates beneath offshore regions of the United States in water greater than 500 meters in depth.

An alternative operating context of the invention is illustrated in FIG. 4B where a drillship 40 is shown floating upon the surface 42 of a body of water 44 such as the Gulf of Mexico. In this marine environment pressures in water depths approximately greater that 500 meters have been conducive to the formation again of geologic layers of gas hydrates 46, such as methane hydrates, beneath the seabed 48.

Offshore drilling in water depths of 500 meters or more is now technically possible so that drilling into the offshore gas hydrate formations 46 and cementing a casing into a well hole offshore to form a production strata 50 is another source of production of methane from a gas hydrate formation. Again, directional drilling from a subsea template enables fifty or more wells to be drilled from a single drillship location.

The present disclosure includes acoustic systems for monitoring oil and/or gas production, deployment of such systems, and modeling/measurement evaluation. In certain aspects of the present disclosure, application is made to methods and systems for producing gas hydrates. One of the most promising technologies for gas hydrate production is the depressurization method. To achieve long term production, changes in key reservoir parameters must be monitored in order to make appropriate decisions for well intervention.

The present disclosure provides an integrated measurement system to evaluate different physical properties of subterranean formations. The integrated monitoring program may include crosswell acoustic, crosswell resistivity and distributed formation temperature and pressure measurements. Combined measurements and joint inversion of the acoustic-resistivity monitoring data to obtain formation imaging provides estimates of parameters that control the efficiency of the dissociation process, verify the gas production, and detect potential hazards related to formation instability.

In certain embodiments, permanent acoustic crosswell monitoring systems may be provided in accordance with the present disclosure to investigate subterranean formations. A permanent installation may include, for example, an array of downhole acoustic sources in the production well and a permanent/semi-permanent acoustic sensor array in a monitoring well, or vice versa.

The envisioned system may be designed to obtain maximum sensitivity to expected relatively small dissociation volumes in order to provide information at the early stages of production. In this, applicants have found that the location of sensors or transmitters in the production well provides an unexpectedly sensitive acoustic monitoring system. In accordance with the principles described herein, velocity profile and/or attenuation factor of gas hydrates bearing formations may be interpreted to derive indication of the dissociation front. For example, applicants recognized that as gas hydrates dissociate formation velocity becomes slower and less attenuation occurs. By observing change in velocity/attenuation profile it is possible to monitor the location and time progression of the dissociation front. Furthermore, the present disclosure envisions that real time acoustic data may be compared with synthetic data that are generated using formation simulation computer programs to determine key formation parameters and to validate simulated formation analysis results.

The acoustic sources of the present disclosure are designed for excellent repeatability and fast shooting rate to provide high frequency broadband signals. Several applications are envisioned including high resolution tomography, continuous time lapse crosswell seismic, stress detection monitoring, among others.

In one possible embodiment, acoustic sources are installed in a casing annulus that is to be cemented. In this, acoustic measurements may be acquired during production by crosswell seismic measurements between the production well and the monitoring well without extracting the production string (note FIG. 3). Acoustic sources that are deployed in this configuration have to be small enough to fit in a casing annulus.

Regardless of the method of conveyance and the environment in which it is used, the present disclosure may benefit from having acoustic sources near a position of the well that is undergoing condition changes. For example, the source(s) that can be placed in the production well that has downhole conditioning change near by/around well, e.g. near a dissociation front of a hydrate reservoir.

The present disclosure provides a solenoid hammer source that is designed to generate a large impulse signal with a small solenoid. Commonly owned U.S. Pat. No. 6,782,970, previously incorporated herein in its entirety, discloses one possible hammer source in accordance with the present disclosure.

Figure 8:
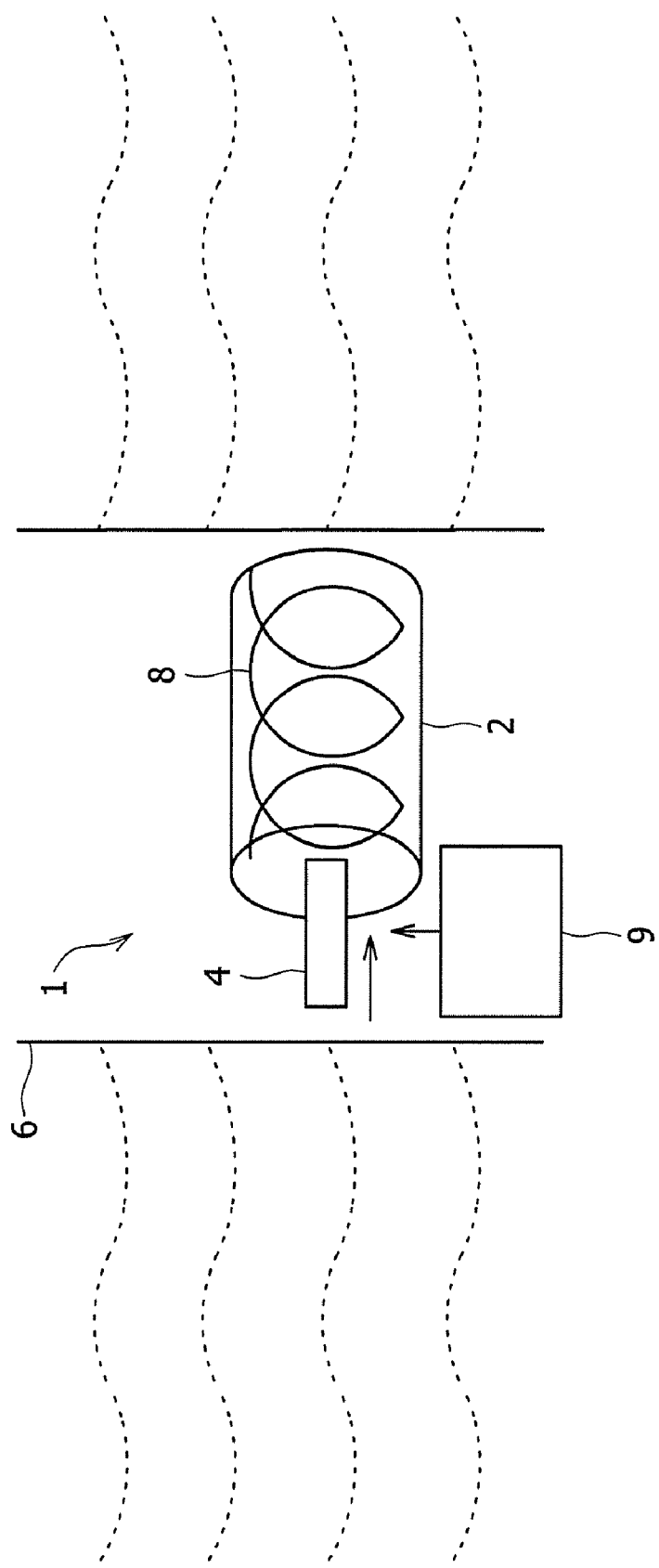
FIG. 8 is a schematic depiction of one possible acoustic source according to the present disclosure.

Referring to FIG. 8, one possible acoustic source according to the present disclosure has a solenoid 2 with a plunger 4 and a coil 8. The driving electronics of the acoustic source 1 are not shown; however, the plunger 4 is positioned within the solenoid coil 8 such that the plunger 4 can be moved by a magnetic force that is generated by applying a current to the solenoid coil 8. Acoustic energy is generated by contact of the plunger 4 with, for example, the borehole wall 6. A position sensor 9 is provided to detect the position of the solenoid plunger 4 so that a current profile of the solenoid can be determined.

It is envisioned that electronics associated with the source 1 are designed such that the downhole electronics comprise only a solenoid coil. The present disclosure envisions a hammer source that is suitably packaged for downhole applications, for example, outside casing applications, of the acoustic source, and techniques for detecting firing times of a permanent source. In this, the applicants realized that it is possible to determine the firing time by inputting a current profile of the hammer solenoid without need for a motion detecting sensor to be installed near the source such as, for example, an accelerometer. Monitoring of the solenoid current profile is accomplished by sensing the position of the solenoid plunger. As a consequence, two electric lines are sufficient to drive the acoustic source and to monitor the firing time thereby simplifying downhole electronics and the associated wiring.

In an alternate embodiment, the firing time of the hammer source may be accurately determined by monitoring a solenoid coil inductance. For example, by monitoring the firing power line current. As such, in using a constant current power source, the firing time may be determined by monitoring voltage change. In other words, by monitoring the induction of the coil, accurate firing time may be detected. In this configuration, the source driving and monitoring may be accomplished with the same line, thus eliminating the typical two line requirement—one for monitoring and one for power.

In one possible configuration, acoustic sources according to the present disclosure may be cemented and coupled to the formation so that source energy is directly coupled to the formation. With respect to time lapse measurements, the acoustic sources of the present disclosure are repeatable with positioning error being eliminated because the sources are cemented in the casing annulus. In addition, small packaging of the acoustic sources provides for the deployment of multiple sources in one well in a source array configuration.

The present disclosure contemplates that the size of the sources disclosed herein will allow a plurality of acoustic sources to be mounted on a tool such as Schlumberger's VSI seismic tool. In consequence, the present disclosure envisions a retrievable downhole source array or a single well seismic array tool with the acoustic sources and receiver(s) combined in one tool string. In such a configuration, a tilt mechanism may be provided to enhance the source signal.

Figure 5:
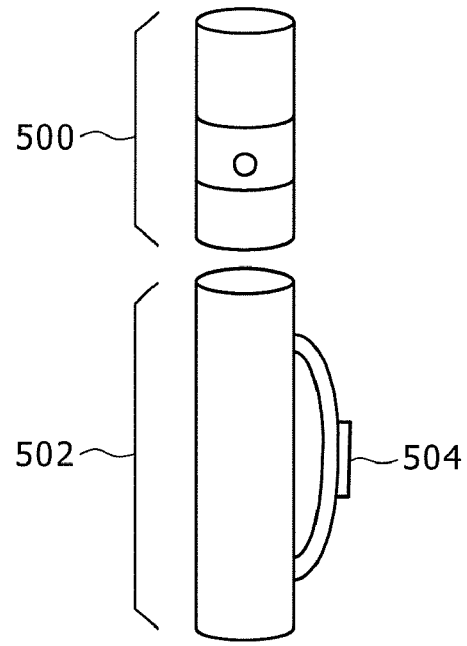
FIG. 5 is a schematic representation of some possible configurations for seismic shuttles having acoustic sources according to the disclosure herein.

FIG. 5 shows some possible configurations for an acoustic source section or module according to the principles described herein. Section 500 is one example of a tool module with a source section 202 such as illustrated in FIG. 2A and described above. Section 502 shows another example of a tool module in accordance with the present disclosure. A coupling member 504, for example, a bowspring, may be provided for coupling the source signals with the borehole wall. Element 502 may be an optional add-on to the system comprising one or more hydrophones and/or geophones. The receivers may be used in creating a velocity profile in a horizontal well. However, in this case, the tool must be stopped and stabilized for taking the measurements due to noise sensitivity of the geophones.

In certain instances an undesirable signal to noise ratio might be created, and tool design combined with signal processing for noise cancellation may be desirable to creating an accurate velocity profile. In addition to other sources, acoustic noise is expected from tubewaves and turbulent flows around the tool. The first approach is mechanical, essentially designing the tool to decrease noise caused by multiple source signals. Aside from these mechanical solutions, another approach is to apply algorithmic noise cancellation.

Figure 6:
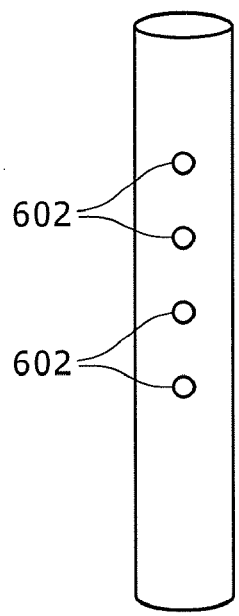
FIG. 6 is a schematic representation of yet another possible seismic source shuttle according to the principles discussed herein.

FIG. 6 shows another aspect of an acoustic source section module according to the principles described herein where, for example, four hammer acoustic sources labeled 602 are spaced apart. The spacing may be selected based on what is sufficient to properly generate acoustic signals, and other orientations for the plurality of acoustic sources may also be used.

Figure 7:
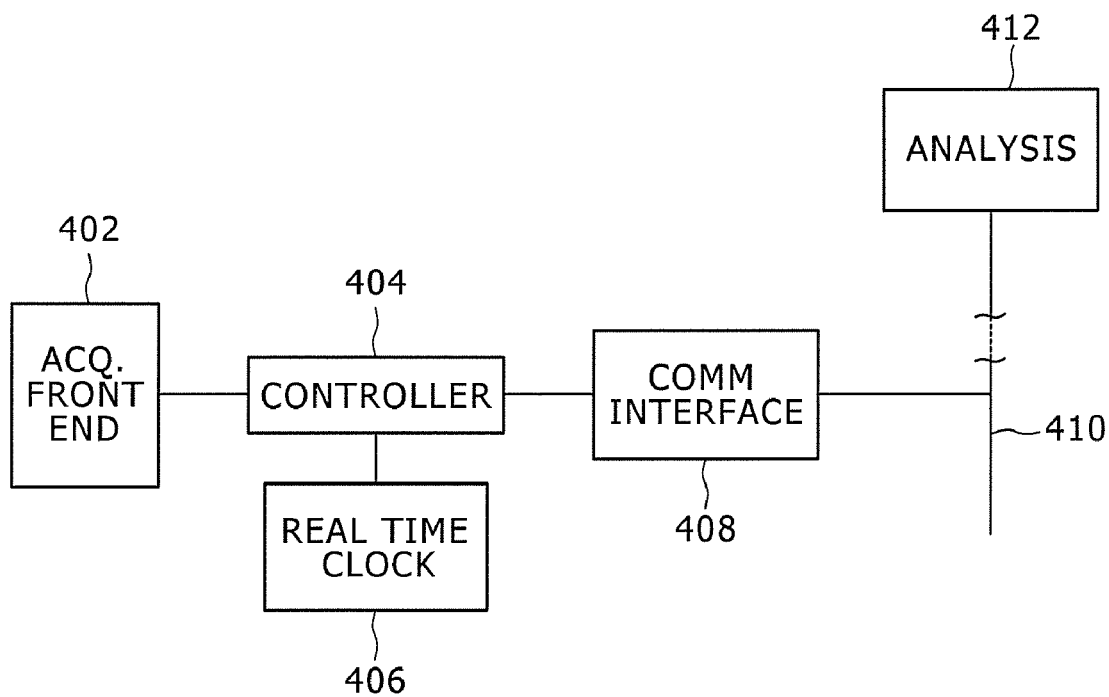
FIG. 7 is a block diagram representation of one possible seismic sensor configuration according to the principles discussed herein.

FIG. 7 shows one example of a sensor section or arrangement according to the principles discussed herein. Note, for example, FIGS. 2A and 3. The acquisition front end 402 may contain the sensor elements described above, as well as their associated connections and electronics. For example, the acquisition section 402 may include electronics suitable for the relevant or desired frequencies that are to be received by the receiving device. In this, electronics for signal conditioning and digitization may be included as known to those of skill in the art. The overall operation of the system is coordinated by controller 404. The controller is capable of adjusting the acquisition parameters for section 402 and timing the start and end of acquisition, among its other functions. A real time clock 406 may be used to provide the time to the controller for the determination of when a signal is received and for timing the appropriate collection intervals. This clock's time is used in concert with the time that the seismic signal is generated so that the travel time can be determined. Information from the controller may be sent to an analysis unit 412. In one embodiment, an analysis unit may be located at the surface of the borehole in platform 214 (note FIG. 2A). Communications interface 408 may be used to convey the signals output from the controller 404 to communication cable 410, and subsequently to analysis unit 412. The analysis unit may perform adaptive noise cancellation as well as determination of the signal velocity for each data collection. The functions of the analysis unit may be distributed between modules at the surface and downhole, as desirable or necessary for the operations described herein.

In certain embodiments of the present disclosure, the controller 404 and the analysis unit 412 are configured to measure the depth of the sensor section at any time. One method of accomplishing this is to measure the amount of conveyance that is output by the winch 210 (note FIG. 2A). Knowing this depth, the seismic sources can be activated with the receivers at a variety of depths. This allows the system to ensure that measurements are taken at specific depths and a complete velocity profile can be calculated.

Referring to FIG. 9, in a method according to the present disclosure, a tool comprising a plurality of acoustic sources is deployed within a wellhole (note flow diagram block 52). Acoustic data measurements are acquired at least one depth in the borehole (note block 54) to provide seismic information of the formation such that the measured data relate to different reservoir parameters of oil and/or gas zones of interest in the formation.

The acquired acoustic data are processed (note block 56) to determine key reservoir parameters (note block 58) relating to, for example, oil production, hydrate dissociation process, gas production, formation structure, among others.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A system for taking acoustic measurements relating to subterranean formations, comprising:
   an acoustic tool comprising a plurality of acoustic sources mounted thereon, at least one of the acoustic sources comprising an actuator adapted to strike a surface to generate acoustic energy;
   a conveyance configured for movement of the acoustic tool in a borehole traversing the subterranean formations;
   at least one receiver configured to detect signals generated by the acoustic sources;
   a computer in communication with the plurality of acoustic sources and the at least one receiver; and
   a set of instructions executable by the computer that, when executed:
      process the acoustic measurements; and
      derive parameters relating to the formation based on the acoustic measurements,
   wherein the at least one acoustic source comprises a hammer source;
   wherein the actuator comprises a solenoid and a solenoid plunger and the hammer source further comprises a sensor configured for sensing the position of the solenoid plunger; and
   the system further comprising a processor configured for monitoring a current profile of the solenoid based on the position of the solenoid plunger.

2. The system of claim 1, wherein the at least one receiver is configured for detecting seismic signals.

3. The system of claim 1, further comprising:
   a controller section operably connected to the at least one receiver and configured to adjust data acquisition parameters;
   a communications interface operably connected to the controller;
   a processing unit, wherein the at least one receiver is configured to transmit electrical signals through the controller section and the communications interface to the processing unit, and
   the processing unit is configured to perform signal processing using the electrical signals from the at least one receiver.

4. The system of claim 1, wherein the at least one receiver is located in a production well.

5. The system of claim 1, wherein the at least one receiver is located in an adjacent borehole traversing the subterranean formation; and
   the system is configured for crosswell data acquisition.

6. The system of claim 1, further comprising a coupling assembly configured for abutting the plurality of acoustic sources with the borehole wall.

7. The system of claim 1, further comprising a controller configured to synchronize firing of the plurality of acoustic sources and seismic signal detection of the at least one receiver.

8. The system of claim 1, further comprising a controller configured to control firing of the plurality of acoustic sources based on the location in the borehole of the acoustic tool.

9. The system of claim 8, wherein the controller is further configured to control the sources such that signals are generated at intervals of depth of the acoustic tool.

10. The system of claim 1, further comprising a plurality of shuttles wherein each shuttle includes a corresponding one of the plurality of acoustic sources.

11. The system of claim 1, wherein the actuator is adapted to strike a borehole wall to generate the acoustic energy.

12. A method for taking acoustic measurements relating to a subterranean formation, comprising:
   deploying a conveyance and an acoustic tool in a borehole traversing the subterranean formation, the acoustic tool comprising a plurality of acoustic sources, at least one of the acoustic sources comprising an actuator adapted to strike a surface to generate acoustic energy;
   detecting seismic signals, generated by the plurality of acoustic sources, that are movable up and down in the borehole by the conveyance, at least one depth in the borehole;
   processing the acoustic measurements; and
   deriving parameters relating to the formation based on the acoustic measurements,
   wherein the derived parameters relate to gas hydrates bearing formations and comprise dissociation front of the gas hydrates,
   wherein the actuator comprises a position sensor to detect the position of the actuator.

13. The method of claim 12, further comprising determining a firing time of the plurality of acoustic sources by monitoring a current profile of a solenoid associated with each acoustic source.

14. The method of claim 12, wherein the acoustic tool further comprises a plurality of shuttles wherein each shuttle includes a corresponding one of the plurality of acoustic sources.

15. The method of claim 12, wherein the seismic signals are detected by deploying at least one receiver in a production well.

16. The method of claim 12, wherein the seismic signals are detected by deploying at least one receiver in an adjacent borehole traversing the subterranean formation; and
   the method further comprising configuring the acoustic tool and at least one receiver for crosswell data acquisition.

17. The method of claim 12, wherein the actuator is adapted to strike a borehole wall to generate the acoustic energy.

18. The method of claim 12, wherein the actuator comprises a solenoid with a plunger; and wherein the position sensor detects the position of the plunger.

* * * * *